United States Patent [19]
Kishimoto

[11] 3,794,990
[45] Feb. 26, 1974

[54] SYSTEM FOR DRIVING LIQUID CRYSTAL DISPLAY DEVICE

[75] Inventor: Juji Kishimoto, Tokyo, Japan

[73] Assignee: Canon Kabushiki Kaisha, Tokyo, Japan

[22] Filed: Nov. 11, 1971

[21] Appl. No.: 197,896

[30] Foreign Application Priority Data
Nov. 17, 1970  Japan.............................. 45-101620

[52] U.S. Cl.............. 340/336, 58/50 R, 340/324 R, 350/160 LC
[51] Int. Cl. ................................................ G08b 5/36
[58] Field of Search .......... 340/324 R, 324 M, 336; 350/160 LC; 58/50 R

[56] References Cited
UNITED STATES PATENTS

| | | | |
|---|---|---|---|
| 2,995,682 | 8/1961 | Livingston...................... | 315/169 R |
| 3,311,781 | 3/1967 | Duinker et al............. | 315/169 R X |
| 3,322,485 | 5/1967 | Williams........................ | 350/160 LC |
| 3,409,876 | 11/1968 | Uphoff................................ | 340/166 |
| 3,551,689 | 12/1970 | Zanoni...................... | 350/160 LC X |
| 3,575,491 | 4/1971 | Heilmeier...................... | 350/160 LC |
| 3,575,492 | 4/1971 | Nester et al.................. | 350/160 LC |
| 3,646,544 | 2/1972 | Yamaguchi...................... | 340/324 R |

*Primary Examiner*—David L. Trafton
*Attorney, Agent, or Firm*—Fitzpatrick, Cella, Harper & Scinto

[57] ABSTRACT

A liquid crystal display device is driven by alternating current applied thereto by a switching circuit comprising a group of MOS transistors. The transistors are switched in response to display signals applied to the respective gate electrodes by a control circuit such as the output circuitry of a computer.

6 Claims, 12 Drawing Figures

FIG. 8
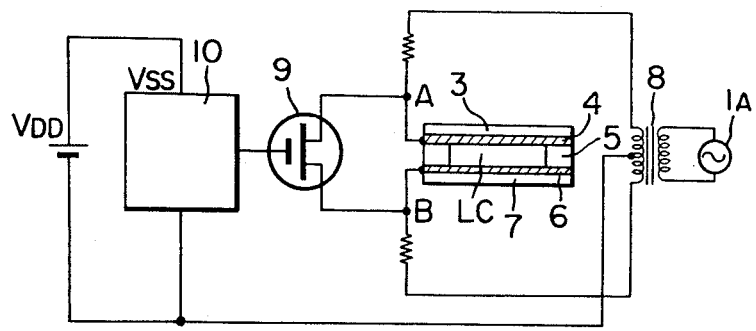
FIG. 10
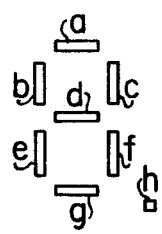
FIG. 11
VOLTAGE LEVEL
Vss ——————— (0V)
VDD ——————— (-15V)
VGG ——————— (-30V)
FIG. 12
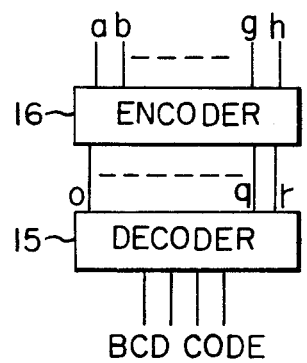

SYSTEM FOR DRIVING LIQUID CRYSTAL DISPLAY DEVICE

BACKGROUND OF THE INVENTION

1. Field of the Invention

The present invention relates to a system for driving a display device utilizing liquid crystals, and, more particularly, a system capable of increasing remarkably the service life of the crystal liquid used in the display device. The system for driving a liquid crystal display device in accordance with the present invention is especially effective for application to large scale integrated circuit devices.

2. Description of the Prior Art

In the past, DC or pulse driving systems have been used for driving liquid crystal display devices. The service life of the liquid crystal used in the display devices is greatly dependent on voltage and current applied thereto. Even when a driving voltage is used which is less than a breakdown voltage of the liquid crystal, to drive the display device without changing the polarity, the composition of the liquid crystal is changed when such voltage is applied for a long time so that is gradually degenerates in function. For example, in a liquid crystal display device utilizing the nematic liquid crystal whose major portion is anisylidene-para-aminophenyl-acetate (APAPA), in which the total thickness of the liquid crystal is of the order of 25 microns, the contrast ratio, that is the difference in light transmission between a portion to which the voltage is applied and a portion to which no voltage is applied, is increased as the applied DC current is increased. For example, the reflection contrast is saturated at 40 – 50 volts. Therefore, a high voltage cannot be applied in the case of a dynamic display. Furthermore when the DC voltage is applied, the service life of the crystal becomes very short, and craters and blurs are produced in hundreds of hours.

One of the objects of the present invention is therefore to provide an improved system for driving a liquid crystal display device.

Another object of the present invention is to provide a system for driving a liquid crystal display device in which the liquid crystal is driven not by direct current, but by alternating current, thereby increasing the service life of the liquid crystal.

Another object of the present invention is to provide a system for driving a liquid crystal display device which is simple in contruction and capable of utilizing as a power source a residential electric distribution line source.

Another object of the present invention is to provide a system for driving a liquid crystal display device which is adapted for dynamic display.

Another object of the present invention is to provide a system for driving a liquid crystal display device especially adapted for use with large scale integrated circuit devices whose elements are MOS-FET or metal oxide semiconductor field-effect transistors.

The above and other objects, features and advantages of the present invention will become more apparent from the following description of the preferred embodiments thereof taken in conjunction with the accompanying drawings in which:

FIG. 8 is a circuit diagram of a second embodiment of the present invention;

FIG. 10 is a diagram illustrating the mosaic array of the display segments in each liquid crystal display unit;

FIG. 11 is a view illustrating the levels of the voltages applied to the MOS transistors in the circuit shown in FIG. 9; and FIG. 12 is a schematic view of a cascaded decoder and encoder composing the converter in the circuit shown in FIG. 9.

Figure 1:
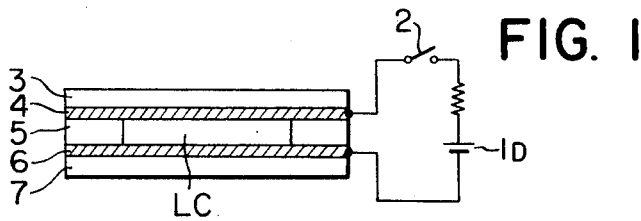
FIG. 1 is a diagrammatic view of a prior art system for driving a liquid crystal display with a DC power source.

DESCRIPTION OF THE PREFERRED EMBODIMENT:

The prior art liquid crystal display device illustrated diagrammatically in FIG. 1 is driven by a system in which a voltage applied from a DC power source $1_D$ is switched by a switch 2 so that the service life of the display device is too short for practical applications. The liquid crystal display device comprises in general a pair of outer transparent glass plates 3 and 7, a transparent electrode 4 such as the electrode commercially available under the trademark of NESA electrode, a pair of spacers 5 made of an insulating material such as "Mylar" (trademark, supplied by Dupont), a thin film 6 deposited by the vacuum evaporation of Ni and Al, and a liquid crystal LC.

Figure 2:
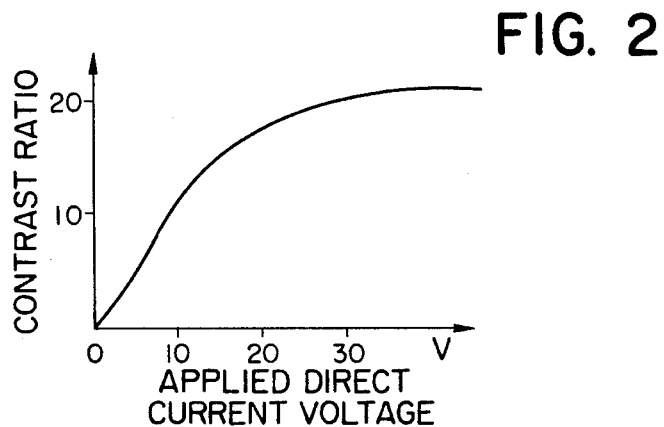
FIG. 2 is a graph illustrating the relationship between the DC voltage applied and the contrast ratio.

FIG. 2 depicts an applied direct current-contrast ratio curve of the display device shown in FIG. 1. When the liquid crystal display device is driven by direct current, it is saturated with applied voltage over about 35 voltage.

Figure 3:
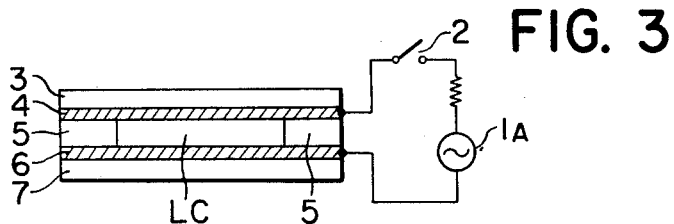
FIG. 3 is a diagrammatic view illustrating a principle of the present invention.

According to the present invention, the liquid crystal display device of the type described is driven by an AC power source $1_A$ shown in FIG. 3. The elements corresponding to those of FIG. 1 are assigned the same reference designations. The voltage applied across the liquid crystal display device is controlled by the switch 2 so that the polarity applied to the opposing electrodes 4 and 6 is reversed at each cycle, and it has been confirmed that the service life of the display device driven as in FIG. 3 may be increased over ten times that the prior art display device.

Figure 4:
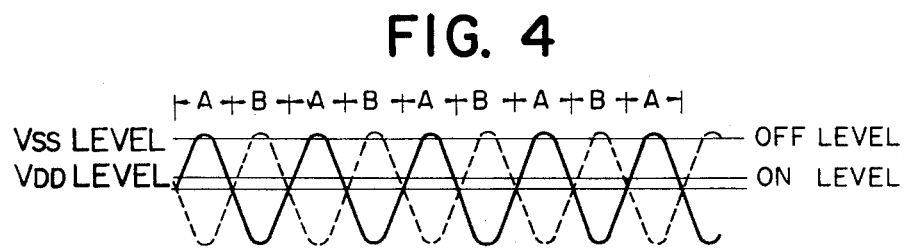
FIG. 4 is a graph illustrating the voltage waveform of the power source used in the present invention.
Figure 7:
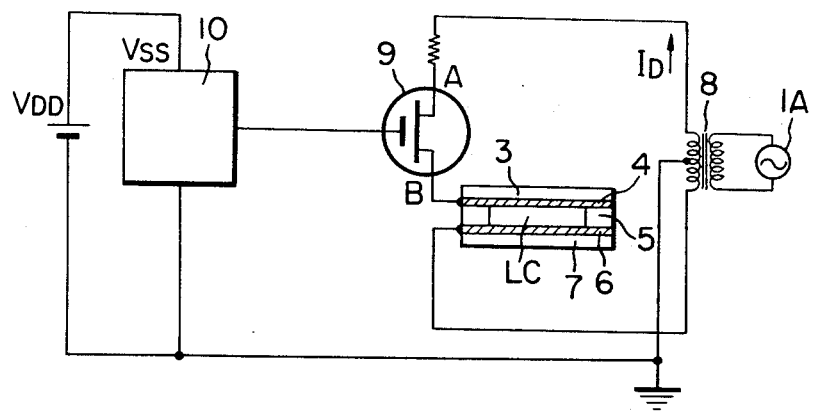
FIG. 7 is a circuit diagram of a first embodiment of a system for driving a liquid crystal display device constructed in accordance with the present invention.

Furthermore, the inventor has succeeded in providing drive circuits utilizing MOS transistors which are very advantageous in the manufacture of large scale integrated circuits as will be described in more detail hereinafter. According to the present invention, the AC power source $1_A$ is used as shown in FIG. 7, with the AC power source being for example a commercial electric distribution line to a residence. Referring to FIG. 7 showing one embodiment of the invention, the source of drain of a MOS field-effect transistor or MOS-FET is connected to the electrode 4 of the liquid crystal display device, and one terminal of the secondary of a transformer 8 is connected to the electrode 6, while the center tap of the secondary of the transformer 8 is connected to ground. The gate of the MOS-FET is connected to a control circuit 10. In general, a MOS-FET is bipolar so that its drain may be used as a source while the source may be used as the drain depending upon the polarity of the voltage applied. That is, as shown in FIG. 4, the two principal conducting electrodes A and B of the MOS-FET function alternately as the source and drain at each half cycle. More specifically, in the first half cycle the electrode A functions as the source and in the second half cycle its functions as the drain. To the gate of the MOS-FET is normally applied a voltage Vss of off-signal level from the control circuit.

The control circuit 10, which is for example an output circuit for an electronic computer, comprises MOS integrated circuits, and since the bias voltage source $V_{DD}$ for the MOS-FET is connected to the midpoint of the secondary of the transformer 8, the AC voltage is applied to the electrodes A and B of the MOS-FET, and thus to the electrodes 4 and 6 of the liquid crystal display device, with the voltage $V_{DD}$ as a reference voltage. The difference of the reference voltage $V_{DD}$ and the voltage Vss of off signal level is 15 volts. When a display signal is applied from the control circuit 10 to the MOS-FET 9 to turn it into the conduction stage, the voltage of the AC power source 1 is applied across the electrodes 4 and 6 of the liquid crystal display device to display a numeral or the like. The level of the display signal is such that the potential at the gate of the MOS-FET is more negatively driven than the threshold voltage relative to the potential at the source of the MOS-FET.

Figure 5:
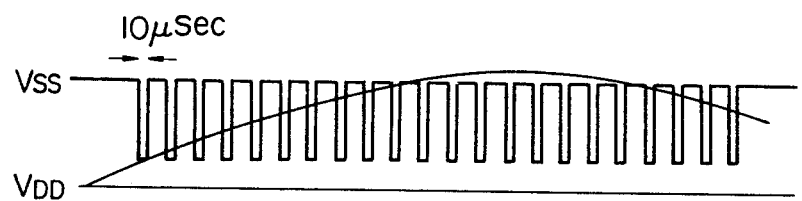
FIG. 5 is a view similar to FIG. 4 illustrating the voltage waveform on enlarged time scale when the display signal is being applied.
Figure 6:
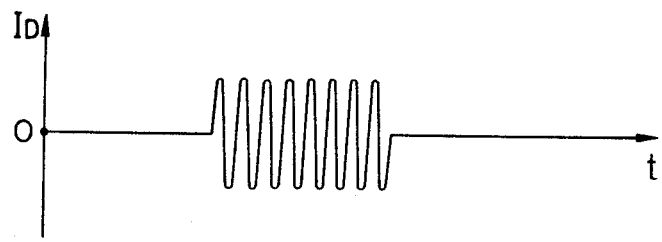
FIG. 6 is a graph illustrating the waveform of the driving current applied to the liquid crystal.

Thus, when the display signal is applied, the driving current as shown in FIG. 6 flows. Since the liquid crystal display device has a high internal resistance, the voltage applied across the electrodes 4 and 6 varies depending upon the frequency of the AC power source 1 (50 or 60 Hz) without being influenced by the pulse width even though the display device is driven with pulses having widths of for example 10 micro-seconds. Therefore, even when the control circuit is actuated at a very high frequency of for example 10 KHz, the function of the display device is not influenced. This is shown in FIG. 5.

In the second embodiment as illustrated in FIG. 8 the voltage is applied to the gate of the MOS-FET to cause it to conduct at the instant when the power source is connected, so that no voltage is applied across the electrodes 4 and 6 of the liquid crystal display device. Therefore, the display device remains blank. When the off-level display signal is applied from the control circuit 10 to the gate of the MOS-FET 9 to cut it off, the voltage from the power source 1 is applied across the electrodes 4 and 6 of the display device to display a numeral or the like.

As described above, according to the present invention, the liquid crystal display device is driven with the AC voltage so that the polarity applied across the electrodes thereof may alternate. Therefore, the service life of the liquid crystal in the display device may be remarkably increased. Furthermore, the present invention provides the very important advantage in practice that the commercial frequency of 50 and 60 Hz may be satisfactorily used, and if required the liquid crystal display device may be driven with a frequency ranging from 0.01 Hz to 200 Hz.

Figure 9:
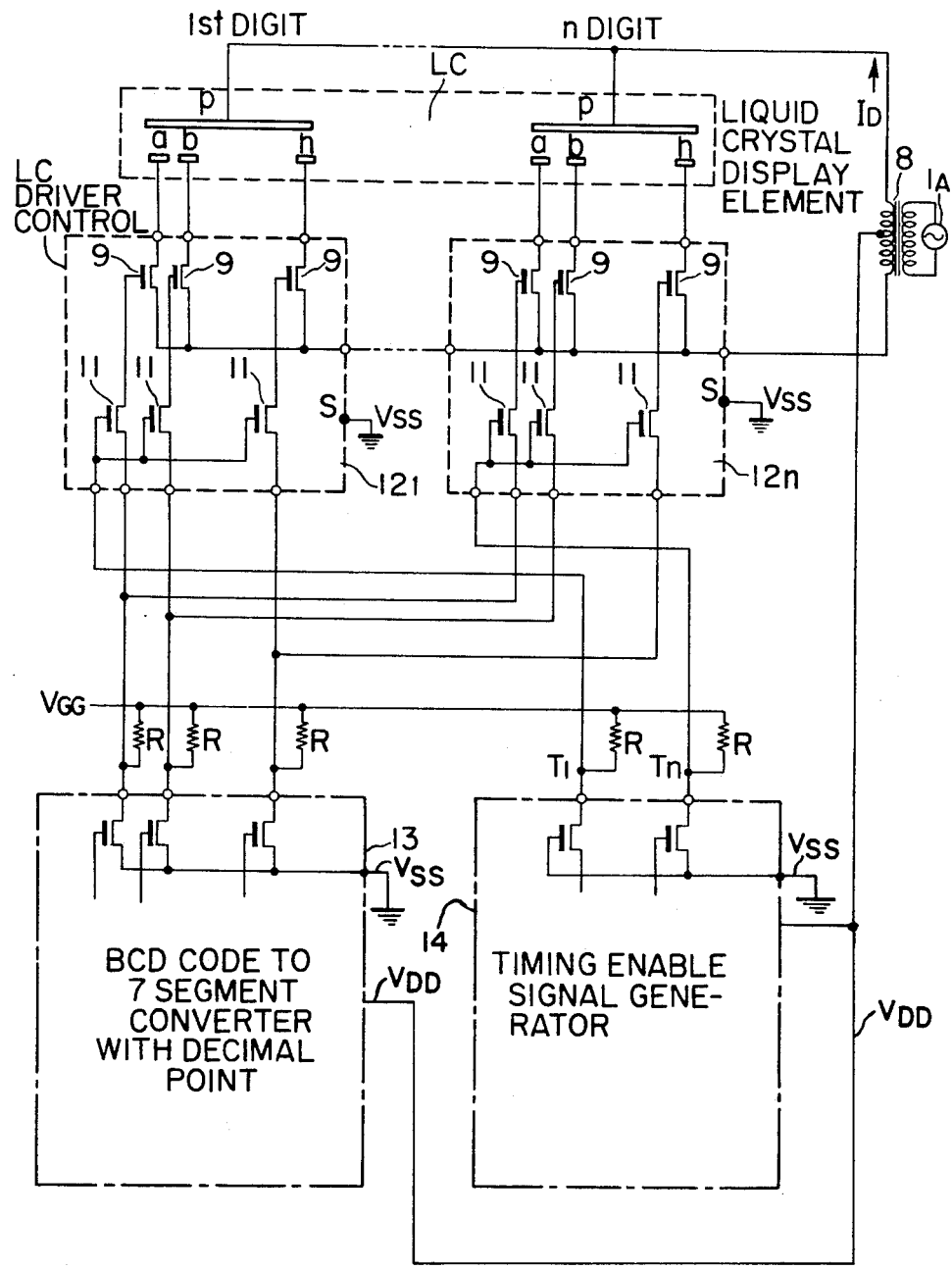
FIG. 9 is a circuit diagram of a liquid crystal display device to which the present invention is applied, the display device being shown as comprising n digit display units each comprising a plurality of display segments arrayed in a mosaic form.

FIG. 9 is a circuit diagram of a liquid crystal display device to which is applied a driving system in accordance with the present invention, and which comprises n liquid crystal display units wherein each digit unit includes eight mosaic display segments or electrodes arrayed in the form of a numeral eight as clearly shown in FIG. 10. Parts similar to those shown in FIG. 7 are designated by the same respective reference numerals.

The positive electrodes P of the digit display units are connected to one terminal of the secondary of the transformer 8 which is coupled to the power source $1_A$, and the source or drain electrodes of the MOS-FETs are connected to the other terminal of the secondary of the transformer 8, whereas the other drain or source electrodes are connected to the segments a–h. To the gates of the MOS-FETs 9 are connected the drain electrodes of corresponding switching MOS-FETs 11, the sources of which are connected to a binary coded decimal code-to-7 segment convertor 13. The gates of the MOS-FETs 11 in each display unit or digit are connected to a common line which in turn is connected to a timing enable signal generator 14.

As shown in FIG. 12, the converter 13 comprises a decoder 15 for decoding one of the binary coded decimal codes and/or decimal point signal, and an encoder 16 for encoding to provide a combination of signals to be applied to the segments a–h of each display unit in response to the output from the decoder 15. The converter 13 of the type described may be designed in various forms, but in the instant embodiment it is designed as an MOS-LSI for systemization. The timing-enable-signal generator 14 is also designed as an MOS-LSI. As described above, the bias voltage $V_{DD}$ of the MOS-FETs in the converters 13 and the generator 14 are connected to the midpoint of the secondary of the transformer 8.

The timing-enable-signal generator 14 is used to apply the digit pulses to the display units or digits sequentially and repetitively from the first digit unit to the n–th digit unit on a time division basis.

All of the MOS-FETS 9 and 11 in each unit or digit are formed as a driving circuit 12, one terminal of which is formed on a common substrate S and is connected to a lead line which is maintained at a ground potential Vss. In the illustrated embodiment the, MOS-FETs take potentials as shown in FIG. 11. This arrangement is advantageous in that the DC coupling between the gate terminal and the source or drain terminal may be eliminated so that the non-directivity of the MOS-FET may be advantageously utilized for driving the liquid crystal display device with the AC power source.

When the display signal from the converter 13 and the digit pulse from the timing generator 14 are applied to the source and gate of each MOS-FET to cause it to conduct, the signal is transmitted to the gate of each transistor 9 to cause its conduction. Therefore the AC driving current flows between the common positive electrode P and the selected segments as shown in FIG. 6 to cause the selected segments to illuminate so that the desired numeral or the like may be displayed by each display unit.

FROM the foregoing description, it is seen that the crystal display device driving system in accordance with the present invention is very simple in construction and is very effective to increase the service life of liquid crystal used in the display device and the AC driving system of the present invention can solve the problem of remanence of the liquid crystal display.

I claim:

1. A system for driving a liquid crystal display device comprising, in combination;
   an alternating current power supply;
   a transformer connected across said alternating current power supply for stepping down voltage developed across a primary winding thereof to a predetermined voltage;
   at least one liquid crystal display unit having two opposing electrodes coupled to a secondary winding of said transformer;
   an MOS transistor having source and drain electrodes interposed between said liquid crystal display unit and said secondary winding and forming a current path when said MOS transistor is operated, and having a gate electrode for switching the conductive states of said liquid crystal display unit:
   a control circuit having an output connected to said gate electrode of said MOS transistor for applying a display signal to said gate electrode to operate said MOS transistor, thereby selectively applying an alternating current voltage across said two opposing electrodes of said liquid crystal display unit; and
   means for maintaining the secondary voltage waveform of said transformer at a constant reference potential level.

2. A system for driving a liquid crystal display device comprising, in combination
   an alternating current power supply;
   a transformer connected across said alternating current power supply for stepping down voltage developed across a primary winding thereof to a predetermined voltage;
   at least one liquid crystal display unit having two opposing electrodes coupled across a secondary winding of said transformer;
   an MOS transistor having source and drain electrodes connected in parallel with said liquid crystal display unit, and having a gate electrode for controlling conduction of said transistor to DEENERGIZE said liquid crystal display unit when said transistor is rendered conductive;
   a control circuit having an output connected to said gate electrode of said MOS transistor for applying a display signal to said gate electrode to render said MOS transistor conductive; and
   means for maintaining the secondary voltage waveform of said transformer at a constant reference potential level.

3. A system for driving a liquid crystal display device comprising, in combination:
   an alternating current power supply;
   at least one liquid crystal display unit means having one electrode coupled to one side of each of a plurality of display elements and connected to one terminal of said power supply, and a plurality of opposing electrodes connected respectively to the other sides of said display elements;
   a first plurality of MOS transistors each having first, second and third electrodes for controlling said liquid crystal display unit means, said first electrodes being connected respectively to said plurality of opposing electrodes of said liquid crystal display unit means, said second electrodes being connected to a common conductor connected to the other terminal of said power supply, said third electrode of each transistor being used as a gate electrode therefor;
   a second plurality of MOS transistors connected in a cascaded form each having first and second principal conducting electrodes and a gate electrode for switching corresponding ones of said first plurality of MOS transistors, said first electrodes being connected respectively to said gate electrodes of said first plurality of MOS transistors to apply a switching signal thereto;
   a binary coded decimal code converter having a plurality of output terminals each connected to corresponding second electrodes of said second plurality of transistors for generating a coded signal; and
   a timing enable signal generator connected in common to said gate electrodes of said second plurality of switching MOS transistors.

4. A system for driving a liquid crystal display device according to claim 3, wherein said alternating current power supply includes a transformer having its secondary connected to said one electrode of said liquid crystal display unit means and to said second electrodes of said first plurality of transistors; and further comprising
   means for maintaining the secondary voltage waveform of said transformer at a constant reference level.

5. A system for driving a liquid crystal display device according to claim 3, wherein said first plurality of transistors are disposed on a substrate, and wherein the system further comprises means for providing a potential difference between said first or second electrode of each of said first plurality of MOS transistors and said substrate.

6. A system for driving a liquid crystal display device according to claim 3, wherein said liquid crystal display unit means comprises a plurality of display units corresponding in number to digits to be displayed and disposed side by side;
   a plurality of dynamic-static converting units associated with said plurality of display units and each comprising a said first plurality of MOS transistors and a said second plurality of switching MOS transistors connected as set forth in claim 8, wherein said plurality of display units are dynamically driven on a time-division basis.

* * * * *

UNITED STATES PATENT OFFICE
CERTIFICATE OF CORRECTION

Patent No. 3,794,990            Dated February 26, 1974

Inventor(s) JUJI KISHIMOTO

It is certified that error appears in the above-identified patent and that said Letters Patent are hereby corrected as shown below:

Column 1, line 25,    "is" (second occurrence) should read --it--;

Column 2, line 65,    after "that" insert --of--;

Column 3, line 8,    "of" (first occurrence) should read --or--;

Column 3, line 12,    "center tap" should read --center-tap--;

Column 3, line 54,    "10 KHz" should read -- 100 KHz--;

Column 4, line 53,    "MOS-FETS" should read --MOS-FETs--;

Column 4, line 57,    after "embodiment" insert --,--;

Column 4, line 57,    after "the" (second occurrence) delete --,--;

Column 5, lines 54/55,    "DEENERGIZE" should read --deenergize--;

Column 5, lines 61/62,    "wavefrom" should read --waveform--;

Column 6, line 58,    "pluraity" should read --plurality--;

Column 6, line 61,    "claim 8, wherien" should read --claim 3, wherein--.

Signed and sealed this 9th day of July 1974.

(SEAL)
Attest:

McCOY M. GIBSON, JR.            C. MARSHALL DANN
Attesting Officer            Commissioner of Patents